US009612446B2

(12) United States Patent
Pugh et al.

(10) Patent No.: US 9,612,446 B2
(45) Date of Patent: Apr. 4, 2017

(54) STEREOSCOPIC OPHTHALMIC LENS VIEWING SETS

(71) Applicant: Johnson & Johnson Vision Care, Inc., Jacksonville, FL (US)

(72) Inventors: Randall B. Pugh, Jacksonville, FL (US); Karson S. Putt, Jacksonville, FL (US); Edward R. Kernick, Jacksonville, FL (US); Daniel Preza, Jacksonville, FL (US); Frederick A. Flitsch, New Windsor, NY (US); Camille Higham, Jacksonville, FL (US); Sharika Snook, St. Augustine, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 360 days.

(21) Appl. No.: 13/842,717

(22) Filed: Mar. 15, 2013

(65) Prior Publication Data

US 2014/0268326 A1 Sep. 18, 2014

(51) Int. Cl.
G02C 7/00 (2006.01)
G02C 7/02 (2006.01)
(Continued)

(52) U.S. Cl.
CPC ..... G02B 27/2228 (2013.01); G02B 27/2207 (2013.01); G02B 27/2264 (2013.01);
(Continued)

(58) Field of Classification Search
CPC .......... G02C 7/043; G02C 7/049; G02C 7/04;
G02C 2202/06; G02C 2202/10;
(Continued)

(56) References Cited

U.S. PATENT DOCUMENTS 5,123,726 A * 6/1992 Webster .................. 351/201
6,002,518 A * 12/1999 Faris ....................... 359/465
(Continued)

FOREIGN PATENT DOCUMENTS

EP          2512777 B1     10/2012
KR       20120139020 A     12/2012
WO     WO 2013011346 A1     1/2013

OTHER PUBLICATIONS

Singapore Search Report Appl No. 10201400340P Date of Mailing Jan. 7, 2015 ; Received from Agent Mar. 9, 2015 ; Date of actual completion of the search: Dec. 29, 2014.

*Primary Examiner* — Bumsuk Won
*Assistant Examiner* — Collin X Beatty

(57) ABSTRACT

The present invention discloses methods and apparatus for forming a Viewing Set of Ophthalmic Lenses for Three-dimensional Perception of stereoscopic media and includes the resulting Viewing Set devices. The Viewing Sets include a left Ophthalmic Lens and a right Ophthalmic Lens, wherein each Ophthalmic Lens includes a translation filter that, when combined, allow for Three-dimensional Perception. The present invention also includes embodiments where the translation filters are included in an encapsulated Rigid Insert or Media Insert, wherein the Media Insert includes a variable optic zone.

15 Claims, 6 Drawing Sheets

(51) Int. Cl.
  *G02C 7/04* (2006.01)
  *G02B 27/22* (2006.01)
  *G02B 27/26* (2006.01)
  *G02C 7/08* (2006.01)
  *G02C 7/12* (2006.01)
  *G02C 7/10* (2006.01)
  *G02B 7/00* (2006.01)

(52) U.S. Cl.
  CPC ............... *G02B 27/26* (2013.01); *G02C 7/04* (2013.01); *G02C 7/083* (2013.01); *G02C 7/104* (2013.01); *G02C 7/12* (2013.01); *G02B 7/002* (2013.01); *G02C 7/101* (2013.01)

(58) Field of Classification Search
  CPC .... G02C 2202/16; G02C 7/083; G02B 27/26; H04N 13/0434; H04N 13/0438; H04N 2213/008
  USPC ... 359/462, 464, 465, 466, 477; 351/159.02, 351/3, 24, 25, 27, 28, 39, 159.03; 345/419, 465
  See application file for complete search history.

(56) References Cited

U.S. PATENT DOCUMENTS

| | | | |
|---|---|---|---|
| 6,851,805 B2* | 2/2005 | Blum et al. | 351/159.03 |
| 7,002,744 B2* | 2/2006 | Evans et al. | 359/487.02 |
| 2005/0105045 A1* | 5/2005 | Legerton et al. | 351/160 R |
| 2005/0259220 A1* | 11/2005 | Neadle et al. | 351/160 R |
| 2006/0012752 A1* | 1/2006 | Chen | 351/177 |
| 2007/0115428 A1* | 5/2007 | Lin | 351/163 |
| 2008/0013044 A1* | 1/2008 | Wanders | 351/161 |
| 2008/0273027 A1* | 11/2008 | Feremans | 345/419 |
| 2009/0213459 A1* | 8/2009 | Amirparviz | 359/465 |
| 2010/0103368 A1* | 4/2010 | Amirparviz et al. | 351/158 |
| 2010/0103369 A1* | 4/2010 | Pugh et al. | 351/158 |
| 2010/0134884 A1 | 6/2010 | Johnson et al. | |
| 2010/0214397 A1* | 8/2010 | Gaskevich | 348/60 |
| 2011/0090454 A1* | 4/2011 | Johnson et al. | 351/163 |
| 2011/0273663 A1* | 11/2011 | Pugh et al. | 351/160 H |
| 2011/0298794 A1* | 12/2011 | Freedman | 345/419 |
| 2012/0259411 A1* | 10/2012 | Hong et al. | 623/6.56 |
| 2012/0281181 A1* | 11/2012 | Chen et al. | 351/159.03 |
| 2012/0314184 A1* | 12/2012 | Saldivar et al. | 351/159.27 |
| 2013/0050639 A1* | 2/2013 | Trajkovska et al. | 351/159.39 |
| 2014/0264978 A1* | 9/2014 | Pugh et al. | 264/1.7 |
| 2014/0327875 A1* | 11/2014 | Blum et al. | 351/159.03 |

* cited by examiner

STEREOSCOPIC OPHTHALMIC LENS VIEWING SETS

FIELD OF USE

This invention describes methods, apparatus and devices related to Ophthalmic Devices that allow for Three-dimensional Perception of specialized two-dimensional media or stereoscopic media, and more specifically, in some embodiments, an Ophthalmic Device with a Rigid Insert or a Media Insert.

BACKGROUND

Traditionally, an Ophthalmic Device, such as a contact lens, an intraocular lens, or a punctual plug included a biocompatible device with a corrective, cosmetic, or therapeutic quality. A contact lens, for example, can provide one or more of vision correcting functionality, cosmetic enhancement, and therapeutic effects. Each function is provided by a physical characteristic of the lens. A design incorporating a refractive quality into a lens can provide a vision corrective function. A pigment incorporated into the lens can provide a cosmetic enhancement. An active agent incorporated into a lens can provide a therapeutic functionality. Such physical characteristics may be accomplished without the lens entering into an energized state.

Recently, the popularity of three-dimensional viewing of specialized two-dimensional images, such as, for example, stereoscopic imagery, has grown. This popularity has prompted a surge in 3-D movies and a development of 3-D televisions. Often, three-dimensional viewing requires a specialized device that interprets the two-dimensional image before the image reaches the eye, allowing the Three-dimensional Perception from the combined Filtered Translations.

More recently, active components have been included in a contact Lens, and the inclusion may involve the incorporation of energizing elements within the Ophthalmic Device. The relatively complicated components to accomplish this effect may derive improved characteristics by including them in insert devices which are then included with standard or similar materials useful in the fabrication of state of the art Ophthalmic Lenses. It may be desirable to improve the process, methods, and resulting devices for realizing inserts of various kinds. It may be anticipated that some of the solutions for energized inserts may provide novel aspects for non-energized devices and other biomedical devices. Accordingly novel methods, devices, and apparatus relating to Ophthalmic Lens Viewing Sets are therefore important.

SUMMARY

The present invention includes innovations relating to a Viewing Set of Ophthalmic Devices for Three-dimensional Perception of stereoscopic media, the set comprising a first Ophthalmic Device for placement on a right eye of a user, wherein the first Ophthalmic Device comprises a first translation filter capable of providing the right eye with a first filtered translation of a stereoscopic media; a second Ophthalmic Device for placement on a left eye of the user, wherein the second Ophthalmic Device comprises a second translation filter capable of providing the left eye with a second filtered translation of the stereoscopic media; and wherein the first filtered translation and the second filtered translation, when viewed concurrently, comprise a Three-dimensional Perception. The translation filters may be imperceptible when not viewing stereoscopic media.

The Ophthalmic Devices may comprise a hydrogel material, and, in some embodiments, the Ophthalmic Devices may further include insert devices, such as Rigid Inserts or Media Inserts. The first insert device may comprise the first translation filter and the second insert device may comprise the second translation filter, such as, for example, through a thermoforming process.

In some embodiments, the first translation filter and the second translation filter may comprise polarization elements, including, for example, circular polarization or linear polarization. In other embodiments, the first translation filter and the second translation filter may comprise dichroic filters, wherein the first translation filter may comprise a first dichroic material, and the first dichroic material filters a first set of wavelength values; the second translation filter comprises a second dichroic material, wherein the second dichroic material filters a second set of wavelength values; and wherein a combination of the first and second set of wavelength values comprises a Three-dimensional Perception, when the first Ophthalmic Lens and the second Ophthalmic Lens are viewed concurrently.

In some embodiments, the Ophthalmic Devices may further comprise Stabilizing Features, wherein the Stabilizing Features are capable of orienting the Ophthalmic Devices on the eye. The Stabilizing Features may also comprise a visual orientation cue to the user, wherein the user may see how the Ophthalmic Devices are oriented prior to placement on the eye.

In some embodiments that may include Media Inserts, the first Media Insert may be capable of controlling a first variable optic region included in an Optic Zone of the first Ophthalmic Device, and the second Media Insert may be capable of controlling a second variable optic region included in an Optic Zone of the second Ophthalmic Device. For example, the Media Inserts may provide a vision-correcting functionality, wherein the variable optic regions may comprise a liquid meniscus lens, wherein an energization of the liquid meniscus lens is capable of altering a power of the variable optic region.

Alternatively, the variable optic regions may comprise the translation filters. For example, the variable optic regions may comprise liquid crystal, wherein an activation of the variable optic region is capable of darkening the Optic Zone of the Ophthalmic Device. In some such embodiments, the alternating activation of the first variable optic region and the second variable optic region may comprise the Three-dimensional Perception of the stereoscopic media.

The Media Insert may further comprise a first sensor, wherein the first sensor is capable of recognizing a presence or an absence of stereoscopic media in a viewing range, and a first activation load in electrical communication with the first sensor, wherein the first activation load is capable of initiating the alternating activation when stereoscopic media is present in the viewing range and terminating the alternating activation when the stereoscopic media is absent in the viewing range.

In such embodiments, the Media Insert may further comprise a second sensor, wherein the second sensor is capable of recognizing a refresh rate of the stereoscopic media and a second activation load in electrical communication with the second sensor, wherein the second activation load is capable synchronizing the alternating activation of the first variable optic region and the second variable optic region with the refresh rate of the stereoscopic media.

DETAILED DESCRIPTION OF THE INVENTION

Figure 1:
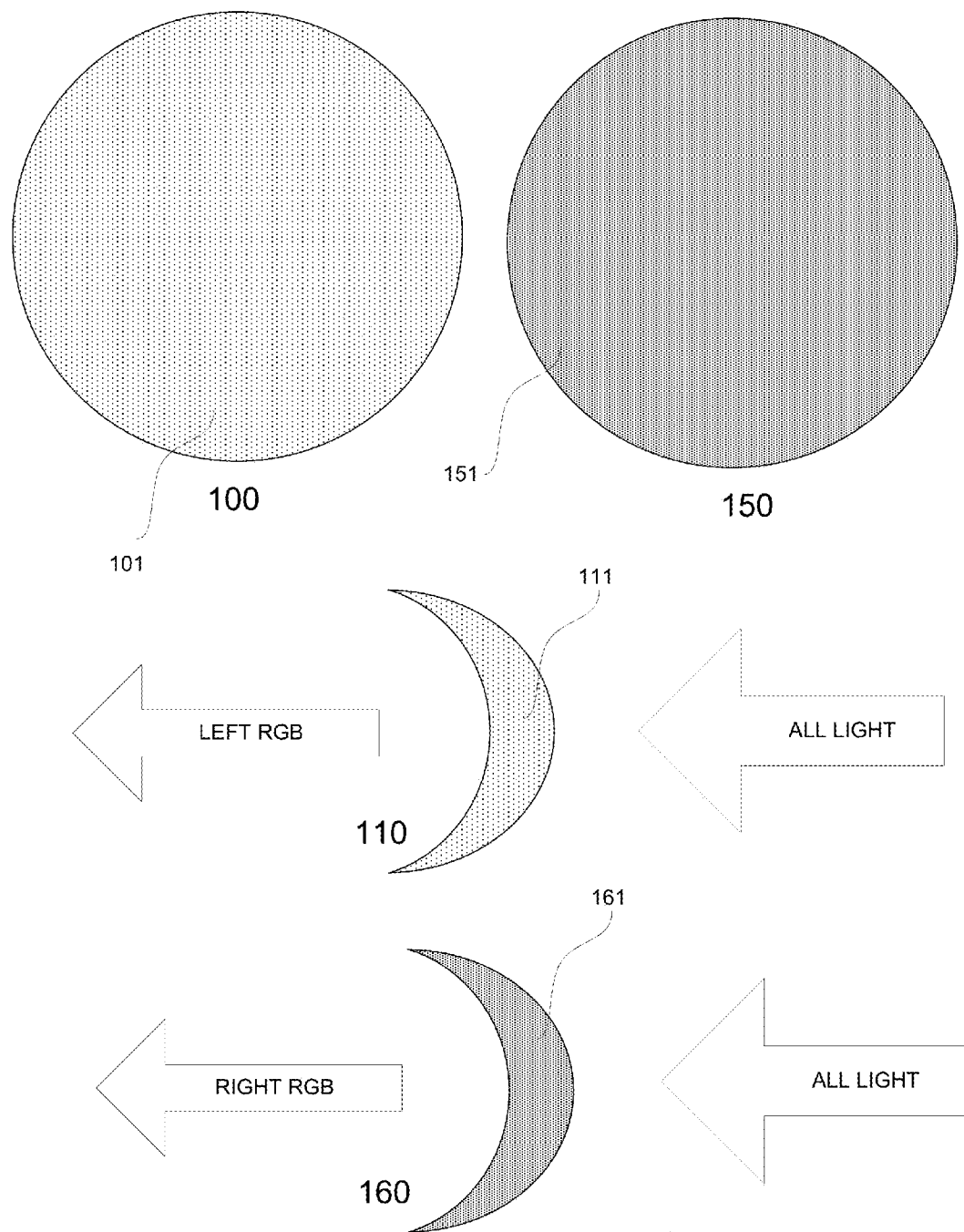
FIG. 1 illustrates an exemplary embodiment of a Viewing Set of Ophthalmic Lenses with translation filters.

The present invention includes methods and apparatus for manufacturing a Viewing Set of Ophthalmic Lenses with translation filters, wherein the Viewing Set allows for Three-dimensional Perception of stereoscopic media. In addition, the present invention includes the resulting Viewing Set of Ophthalmic Lenses.

Stereoscopic media involves the simultaneous display of two images, wherein the brain will interpret the two images as a single image with three-dimensional properties. Some limited media allow for Three-dimensional Perception without requiring a filtering device, such as, for example, in side-by-side stereoscopic imagery, where viewers may force Three-dimensional Perception by crossing their eyes. Other media include autostereoscopic technology, wherein the filtering mechanism is included within the projection device, such as, for example, handheld gaming devices that utilize a parallax barrier. Because the filtering mechanism is included within the projection device, the Three-dimensional Perception does not require further filtering equipment, though the filtering is tailored to a predefined set of eyes and may not be as effective on users with dissimilar characteristics.

Other types of stereoscopic media require additional filtering devices, and, often, the filtering device is portable and personal, wherein each viewer must use the filtering device to experience Three-dimensional Perception. Common filtering devices include "3-D glasses", which are structured like a pair of glasses, wherein each "lens" includes a Translating Filter. When used together to view the stereoscopic media, the two filters allow the brain to experience Three-dimensional Perception.

The resurgence of stereoscopic media has prompted development of the technology. For example, creating stereoscopic media has become more complex allowing for nuanced three-dimensional imagery, wherein the viewer may feel immersed in the filmed environment. Another example includes the development of home theater televisions that utilize stereoscopic media, wherein standard television programming, such as sports, may be Three-dimensionally Viewed. Stereoscopic media may become even more prevalent in the future.

The most prevalent stereoscopic media requires some variation of 3-D glasses. However, the glasses are often cumbersome and expensive, especially for home theaters. In addition, the "lenses" are static, and eye movement shifts the perspective, which may be jarring over prolonged periods, such as, while watching a stereoscopic film. Stereoscopic televisions often include one or two sets of 3-D glasses, inherently limiting the number of viewers. Additionally glasses are available, but are often cost-prohibitive.

Accordingly, the present invention includes an alternative filtering device for Three-dimensional Perception of stereoscopic media. In general, according to some embodiments of the present invention, a Rigid Insert may be embodied within an Ophthalmic Lens via automation, which may place the insert a desired location relative to a mold part used to fashion the lens. The embodiments that place the various components into the Ophthalmic Lens may employ one or more steps where components are sealed and adhered into place or components are encapsulated.

In some embodiments with Media Inserts, an Energy Source is placed in electrical communication with a component, which may be activated on command and draws electrical current from the Energy Source included within the Ophthalmic Lens. A component may include for example, a semiconductor device, an active or passive electrical device, or an electrically activated machine, including for example: Microelectromechanical systems (MEMS), nanoelectromechanical systems (NEMS), or micromachines. Subsequent to placing the Energy Source and component, a Reactive Mixture can be shaped by the mold part and polymerized to form the Ophthalmic Lens.

In the following sections detailed descriptions of embodiments of the invention will be given. The description of both preferred and alternative embodiments are exemplary embodiments only, and it is understood that to those skilled in the art that variations, modifications and alterations may be apparent. It is therefore to be understood that said exemplary embodiments do not limit the scope of the underlying invention.

GLOSSARY

In this description and claims directed to the presented invention, various terms may be used for which the following definitions will apply:

Back Curve Piece or Back Insert Piece: as used herein refers to a solid element of a multi-piece Rigid Insert which when assembled into the said insert will occupy a location on the side of the lens that is on the back. In an Ophthalmic Device, such a piece would be located on the side of the insert that would be closer to the user's eye surface. In some embodiments the back curve piece may contain and include a region in the center of an Ophthalmic Device through which light may proceed into the user's eye, which may be called an Optic Zone. In other embodiments, the piece may take an annular shape where it does not contain or include some or all of the regions in an optic zone. In some embodiments of an ophthalmic insert, there may be multiple back curve pieces and one of them may include the optic zone, while others may be annular or portions of an annulus.

Component: as used herein refers to a device capable of drawing electrical current from an Energy Source to perform one or more of a change of logical state or physical state.

Encapsulate: as used herein refers to creating a barrier to separate an entity, such as, for example, a Media Insert, from an environment adjacent to the entity.

Encapsulant: as used herein refers to a layer formed surrounding an entity, such as, for example, a Media Insert, that creates a barrier to separate the entity from an environment adjacent to the entity. For example, Encapsulants may be comprised of silicone hydrogels, such as Etafilcon, Galyfilcon, Narafilcon, and Senofilcon, or other hydrogel contact lens material. In some embodiments, an Encapsulant may be semipermeable to contain specified substances within the entity and preventing specified substances, such as, for example, water, from entering the entity.

Energized: as used herein refers to the state of being able to supply electrical current to or to have electrical energy stored within.

Energy: as used herein refers to the capacity of a physical system to do work. Many uses within this invention may relate to the said capacity being able to perform electrical actions in doing work.

Energy Source: as used herein refers to device capable of supplying Energy or placing a biomedical device in an Energized state.

Energy Harvesters: as used herein refers to device capable of extracting energy from the environment and convert it to electrical energy.

Filtered Translation: as used herein refers to the resulting perceived image when viewed through a Translation Filter.

Front Curve Piece or Front Insert Piece: as used herein refers to a solid element of a multi-piece Rigid Insert which when assembled into the said insert will occupy a location on the side of the lens that is on the front. In an Ophthalmic Device, a Front Curve Piece would be located on the side of the insert that would be further from the user's eye surface. In some embodiments, the piece may contain and include a region in the center of an Ophthalmic Device through which light may proceed into the user's eye, which may be called an Optic Zone. In other embodiments, the piece may take an annular shape where it does not contain or include some or all of the regions in an optic zone. In some embodiments of an ophthalmic insert, there may be multiple front curve pieces and one of them may include the optic zone, while others may be annular or portions of an annulus.

Lens-forming mixture or Reactive Mixture or Reactive Monomer Mixture (RMM): as used herein refers to a monomer or prepolymer material that can be cured and cross-linked or cross-linked to form an Ophthalmic Lens. Various embodiments can include lens-forming mixtures with one or more additives such as UV blockers, tints, photoinitiators or catalysts, and other additives one might desire in an Ophthalmic Lenses such as, contact or intraocular lenses.

Lens-forming Surface: refers to a surface that is used to mold a lens. In some embodiments, any such surface can have an optical quality surface finish, which indicates that it is sufficiently smooth and formed so that a lens surface fashioned by the polymerization of a lens forming material in contact with the molding surface is optically acceptable. Further, in some embodiments, the lens forming surface can have a geometry that is necessary to impart to the lens surface the desired optical characteristics, including without limitation, spherical, aspherical and cylinder power, wave front aberration correction, corneal topography correction and the like as well as any combinations thereof.

Liquid Crystal: as used herein refers to a state of matter having properties between a conventional liquid and a solid crystal. A Liquid Crystal cannot be characterized as a solid but its molecules exhibit some degree of alignment. As used herein, a Liquid Crystal is not limited to a particular phase or structure, but a Liquid Crystal may have a specific resting orientation. The orientation and phases of a Liquid Crystal may be manipulated by external forces such as, for example, temperature, magnetism, or electricity, depending on the class of Liquid Crystal.

Lithium Ion Cell: refers to an electrochemical cell where Lithium ions move through the cell to generate electrical energy. This electrochemical cell, typically called a battery, may be reenergized or recharged in its typical forms.

Media Insert: as used herein refers to an encapsulated insert that will be included in an energized Ophthalmic Device. The energization elements and circuitry may be embedded in the Media Insert. The Media Insert defines the primary purpose of the energized Ophthalmic Device. For example, in embodiments where the energized Ophthalmic Device allows the user to adjust the optic power, the Media Insert may include energization elements that control a liquid meniscus portion in the Optical Zone. Alternatively, a Media Insert may be annular so that the Optical Zone is void of material. In such embodiments, the energized function of the Lens may not be optic quality but may be, for example, monitoring glucose or administering medicine.

Mold: refers to a rigid or semi-rigid object that may be used to form lenses from uncured formulations. Some preferred molds include two mold parts forming a front curve Mold part and a back curve Mold part.

Ophthalmic Lens or Ophthalmic Device or Lens: as used herein refers to any device that resides in or on the eye. The device may provide optical correction, may be cosmetic, or provide some functionality unrelated to optic quality. For example, the term Lens may refer to a contact Lens, intraocular Lens, overlay Lens, ocular insert, optical insert, or other similar device through which vision is corrected or modified, or through which eye physiology is cosmetically enhanced (e.g. iris color) without impeding vision. Alternatively, Lens may refer to a device that may be placed on the eye with a function other than vision correction, such as, for example, monitoring of a constituent of tear fluid or means of administering an active agent. In some embodiments, the preferred Lenses of the invention may be soft contact Lenses that are made from silicone elastomers or hydrogels, which may include, for example, silicone hydrogels and fluorohydrogels.

Optic Zone: as used herein refers to an area of an Ophthalmic Lens through which a wearer of the Ophthalmic Lens sees.

Power: as used herein refers to work done or energy transferred per unit of time.

Rechargeable or Re-energizable: as used herein refers to a capability of being restored to a state with higher capacity to do work. Many uses within this invention may relate to the capability of being restored with the ability to flow electrical current at a certain rate for a certain, reestablished time period.

Reenergize or Recharge: To restore to a state with higher capacity to do work. Many uses within this invention may relate to restoring a device to the capability to flow electrical current at a certain rate for a specified, reestablished time period.

Released from a mold: means that a lens is either completely separated from the mold, or is only loosely attached so that it can be removed with mild agitation or pushed off with a swab.

Rigid Insert: as used herein refers to an insert that maintains a predefined topography. When included in a Contact Lens, the Rigid Insert may contribute to the functionality of the Lens. For example, varying topography of or densities within the Rigid Insert may define zones, which may correct vision in users with astigmatism.

Stabilizing Feature: as used herein refers to a physical characteristic that stabilizes an Ophthalmic Device to a specific orientation on the eye, when the Ophthalmic Device is placed on the eye. In some embodiments, the Stabilizing Feature may add sufficient mass to ballast the Ophthalmic Device. In some embodiments, the Stabilizing Feature may alter the front curve surface, wherein the eyelid may catch the Stabilizing Feature and the user may reorient the Lens by blinking. Such embodiments may be enhanced by including Stabilizing Features that may add mass. In some exemplary embodiments, Stabilizing Features may be a separate material from the encapsulating biocompatible material, may be an insert formed separately from the molding process, or may be included in the Rigid Insert or Media Insert.

Stacked Integrated Component Devices or SIC Devices as used herein refers to the product of packaging technologies that can assemble thin layers of substrates, which may contain electrical and electromechanical devices, into operative integrated devices by means of stacking at least a portion of each layer upon each other. The layers may comprise component devices of various types, materials, shapes, and sizes. Furthermore, the layers may be made of various device production technologies to fit and assume various contours.

Three-dimensional Perception or Three-Dimensional Viewing: as used herein refers to where an Ophthalmic Device translates a two-dimensional image so that the brain interprets three-dimensional properties within the image.

Three-dimensional Surface or Three-dimensional Substrate: as used herein refers to any surface or substrate that has been three-dimensionally formed where the topography is designed for a specific purpose, in contrast to a planar surface.

Translation Filter: as used herein refers to a property of an Ophthalmic Lens that is permeable to specified image values while impermeable to other specified image values. Image values may include, for example, wavelengths, angles of light, colors, and amount of light.

Viewing Set: as used herein refers to a pair of Ophthalmic Devices that, when used in concert, allows for Three-dimensional Perception.

Ophthalmic Lens Viewing Sets

Proceeding to FIG. 1, an embodiment of a Viewing Set of Ophthalmic Lenses 100, 150 with dichroic translation filters 101, 151 is illustrated. In some embodiments, a left Ophthalmic Lens 100 may include a left dichroic translation filter 101, and a right Ophthalmic Lens 150 may include a right dichroic translation filter 151. As shown in cross section, the left dichroic filter 111 may allow a specific array of red, green, and blue (RGB) light, and the right dichroic filter 161 may allow a different array of RGB light. When the right Ophthalmic Lens 160 and the left Ophthalmic Lens 110 are used as a Viewing Set, the combined filtered translation may allow for Three-dimensional Perception of the stereoscopic image.

The Ophthalmic Lenses 100, 150 may also include other passive elements, such as, for example, cosmetic coloration, including iris patterns, or vision-correcting aspects.

Figure 2:
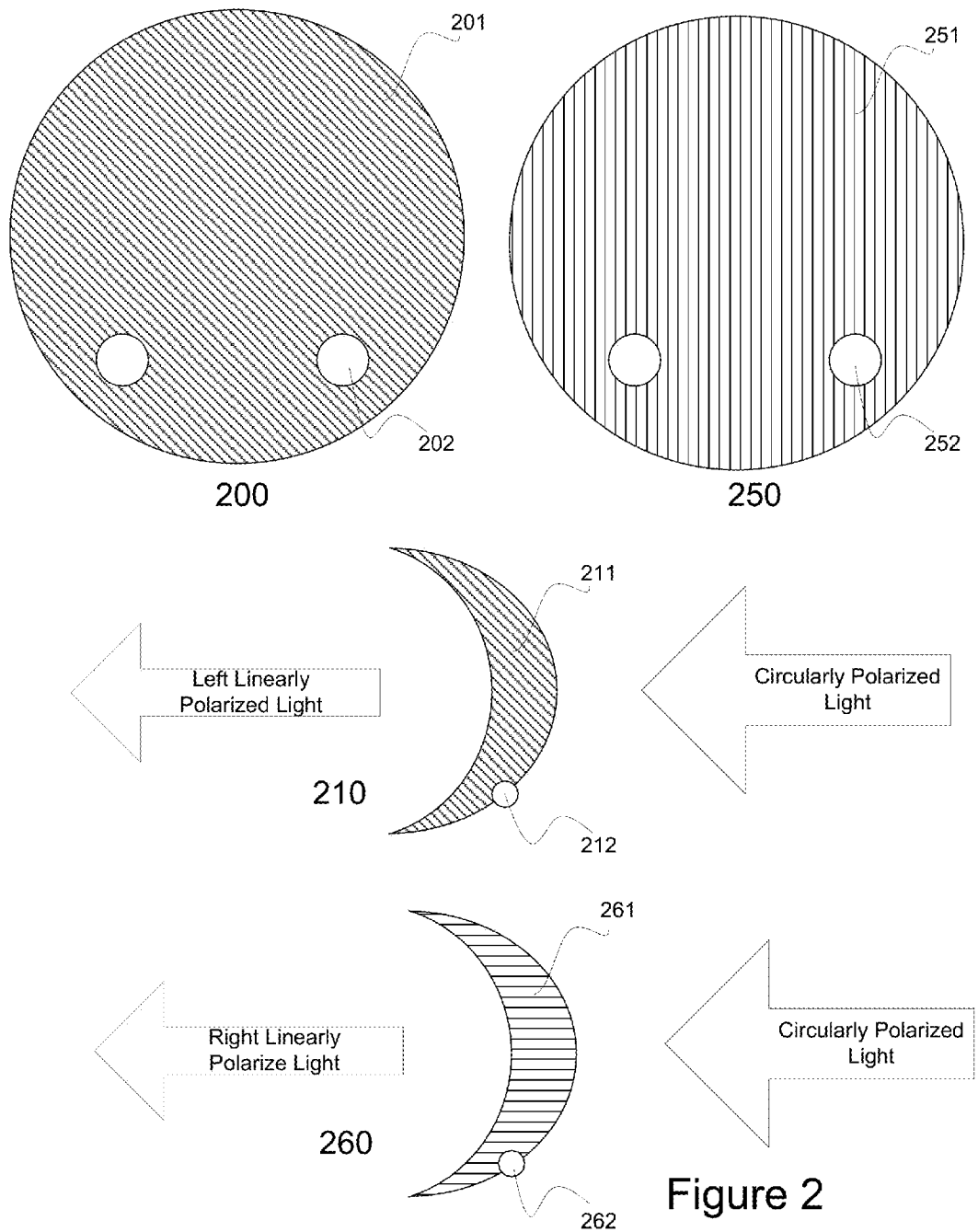
FIG. 2 illustrates an alternate embodiment of a Viewing Set of Ophthalmic Lenses with translation filters.

Proceeding to FIG. 2, an alternate embodiment of a Viewing Set of Ophthalmic Lenses 200, 250 with polarizing translation filters 201, 251 is illustrated, wherein the Ophthalmic Lenses 200, 250 may translate circularly polarized light. There are multiple techniques for polarizing light through a transmissible material including, for example, wire grids, employment of Brewster's angles plates, and employment of birefringent or biaxial materials.

A left Ophthalmic Lens 200 may include a left translation filter 201, and a right Ophthalmic Lens 250 may include a right translation filter 251. As shown in cross section, the left translation filter 211 and the right translation filter 261 may linearly polarize circularly polarized light, wherein the two translation filters 211, 261 may polarize the light at different angles. In some embodiments, where the left Ophthalmic Lens 210 and the right Ophthalmic Lens 260 are used as a Viewing Set, the left filtered translation and the right filtered translation may combine to allow for Three-dimensional Perception of a stereoscopic image.

In embodiments where the polarization may depend on a specific orientation on the eye, the Ophthalmic Lenses 200, 250 may include Stabilizing Features 202, 252. In such embodiments, the Stabilizing Features 202, 252 may be aligned with the translation filters 201, 251. As shown in cross section, the Stabilizing Features 212, 262 may alter the topography of the front curve surface. The altered topography may allow an eyelid to catch the Stabilizing Features 212, 262, and the user may reorient the Ophthalmic Lenses 210, 260 by blinking.

Alternatively, the Stabilizing Features 212, 262 may not affect the topography of the front curve surface, and the added mass may be sufficient to ballast the Ophthalmic Lenses 210, 260 at a specific orientation on the eye. The Stabilizing Features 120 may comprise a material that is different from the encapsulating Reactive Monomer Mixture. To further facilitate placement on the eye, the Stabilizing Feature 212, 262 may contain a tint, wherein the user may see how the Ophthalmic Lens 200, 250 may orient on the eye.

Figure 3:
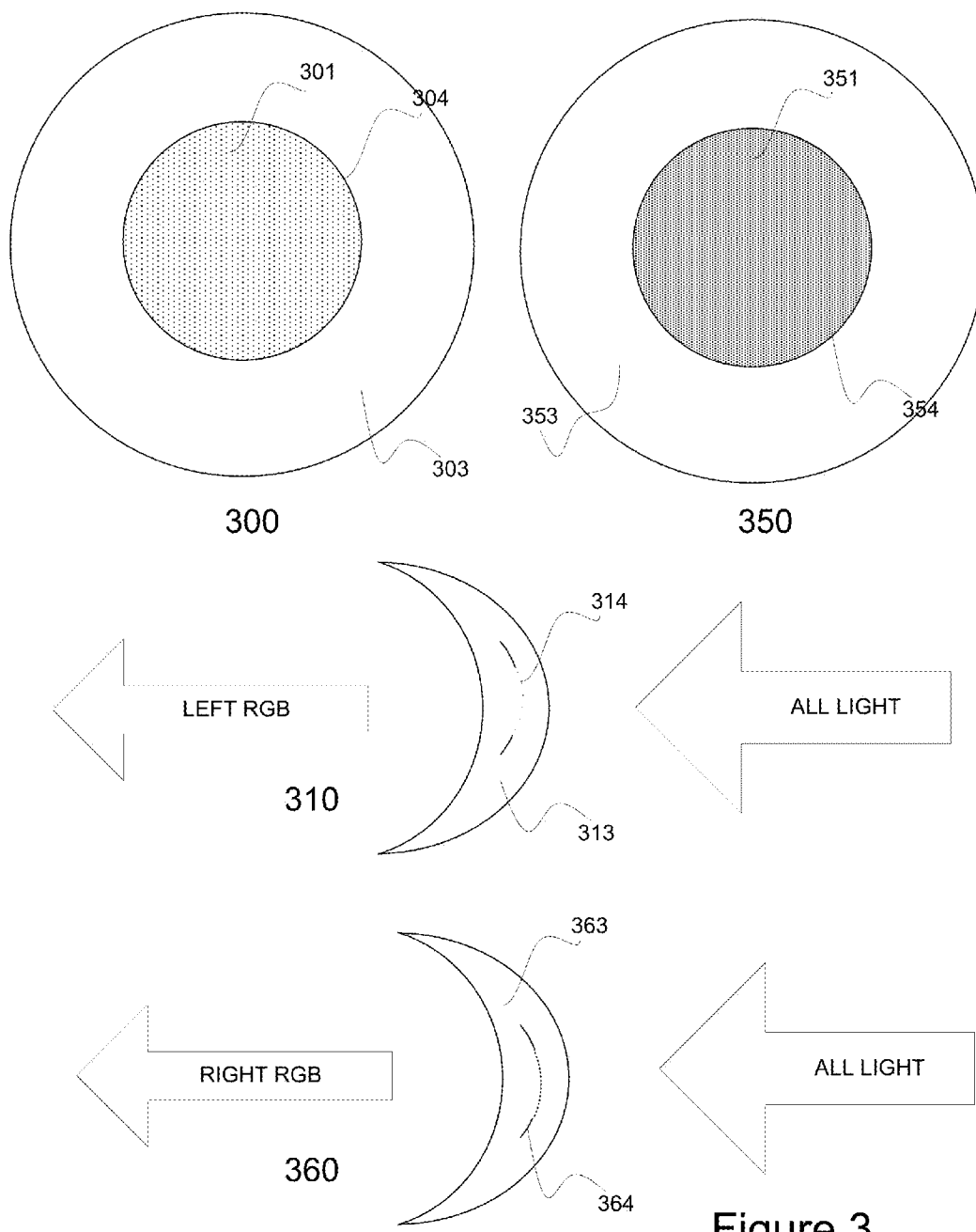
FIG. 3 illustrates an exemplary embodiment of a Viewing Set of Ophthalmic Lenses that may include Rigid Inserts, wherein the Rigid Insert includes the translation filters.

Proceeding to FIG. 3, an embodiment of a Viewing Set of Ophthalmic Lenses 300, 350 with translation filters 301, 351 is illustrated, wherein the translation filters 301, 351 may be included in an encapsulated Rigid Insert 304, 354.

In some embodiments, the Rigid Insert 304, 354 may be included in an Ophthalmic Lens 300, 350, which may comprise a polymeric biocompatible material. The Ophthalmic Lens 300, 350 may include a rigid center, soft skirt design wherein a central rigid optical element comprises the Rigid Insert 304, 354. The encapsulating material 303, 353 of the Ophthalmic Lens 300, 350 may be a biocompatible polymerized material such as a silicone hydrogel, including, for example, Etafilcon, Narafilcon, Galyfilcon, and Senofilcon.

Similar filtering techniques may be utilized in the Rigid Inserts 304, 354 as with the Ophthalmic Lenses 100, 150 wherein the translation filters 101, 150 are included in the soft lens material, as shown, for example, in FIG. 1. The Rigid Inserts 304, 354 may be fully encapsulated with the Ophthalmic Lenses 300, 350. Accordingly, the Rigid Inserts 304, 354 may not be limited to biocompatible material.

In some embodiments, the Rigid Insert 304, 354 may comprise a film of dichroic materials. Some embodiments may include layers of films, each contributing to the translation filters 301, 351. For example, the top and bottom films may act to protect the internal dichroic film, and the protecting layers may be three-dimensionally formed through a thermoforming process.

As shown in cross section, the Rigid Insert 314, 310 may be fully encapsulated by the polymerized RMM 313, 363. The encapsulating process may place the Rigid Insert 314, 364 in the Optic Zone of the Ophthalmic Lenses 310, 360. In some embodiments, the Rigid Insert 314, 364 may extend beyond the Optic Zone. In such embodiments, the periphery portion of the Rigid Insert 314, 364 may provide passive functionalities. For example, the portion outside of the Optic Zone may include cosmetic coloration, such as, for example, iris patterns; or, the periphery may include an active agent. In some embodiments, the active agent may provide relieving hydration, which may be useful when the user's blink rate is low, such as, for example, while viewing stereoscopic media.

Figure 4:
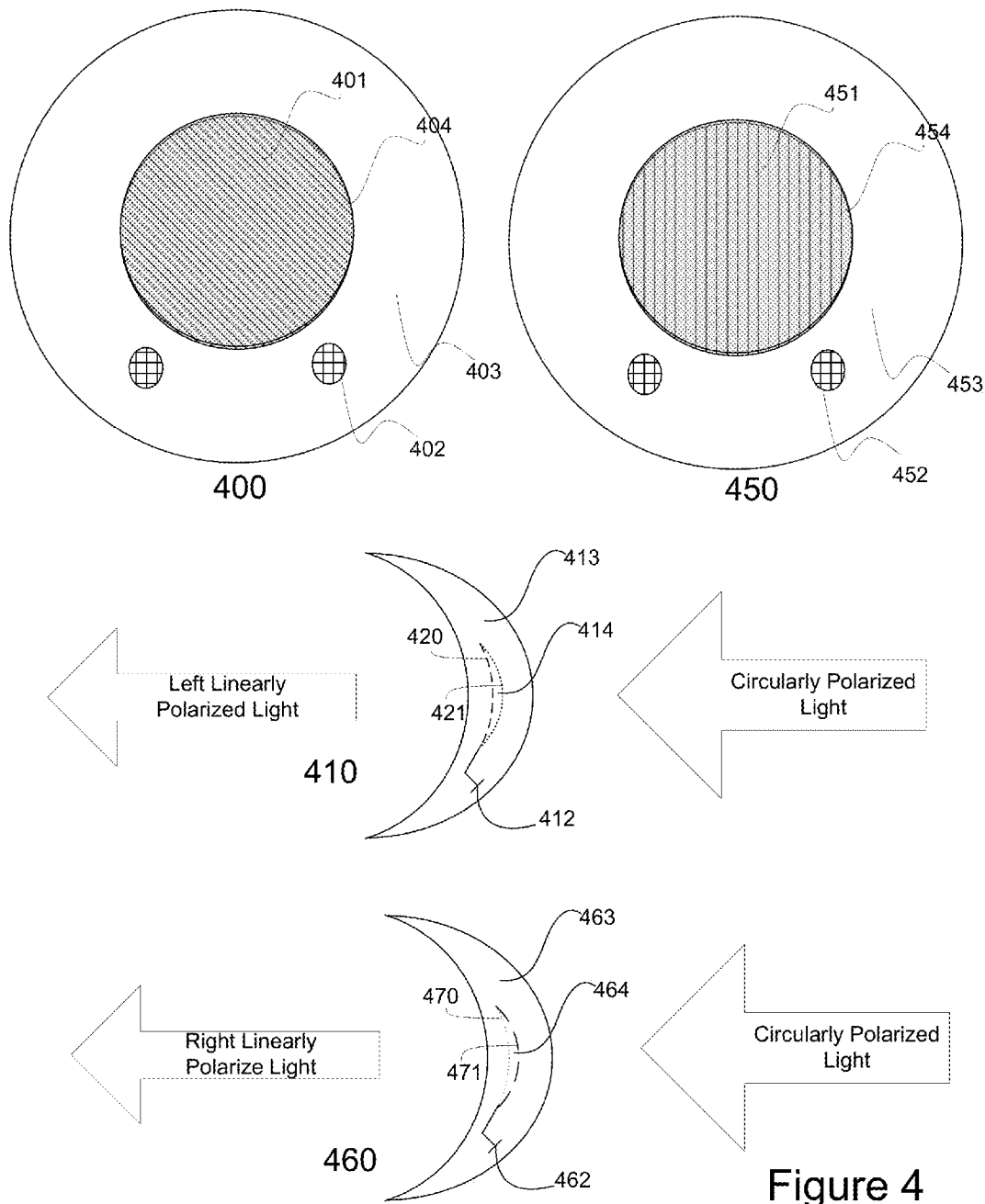
FIG. 4 illustrates an alternate embodiment of a Viewing Set of Ophthalmic Lenses that may include Rigid Inserts, wherein the Rigid Insert includes the translation filters.

Proceeding to FIG. 4, an alternative embodiment of a Viewing Set of Ophthalmic Lenses 400, 450 with Rigid Insert 404, 454 is illustrated. In such an embodiment, the Rigid Insert 404, 454 may translate circularly polarized light. A left Rigid Insert 404 may include a left translation filter 401, and a right Rigid Insert 454 may include a right translation filter 451.

In some embodiments, polarization features 401, 451 may be thermoformed onto an insert piece 404, 454. In some embodiments, such features 401, 451 may be imparted to insert pieces 404, 454 through properties of thin film starting materials. Alternatively, the thermoforming process may be sufficient to impart the polarization features 401, 451.

The filtering function may be developed in a Rigid Insert 404, 454 through a single technique or by a combination of techniques. For example, in some embodiments, the polarizing features 401, 451 of an Ophthalmic Lens 400, 450 may include wire grids and dichroic materials. In some embodiments, the Rigid Insert 404, 454 may be thermoformed from a thin sheet of metallic or conductive filaments or lines deployed in a parallel fashion to form a wire grid.

As shown in cross section, the Rigid Inserts 414, 464 may comprise multiple layers. For example, the front layer 420, 470 may comprise a quarter wave plate, and the back layer 421, 471 may comprise a linear polarizer. and the right translation filter 461 may linearly polarize circularly polarized light, wherein the two translation filters 411, 461 may polarize the light at different angles. In some embodiments, where the left Ophthalmic Lens 410 and the right Ophthalmic Lens 460 are used as a Viewing Set, the left filtered translation and the right filtered translation may combine to allow for Three-dimensional Perception of a stereoscopic image.

Thermoforming techniques may add alignment features to the front layer 420, 470 and the back layer 421, 471, which may allow for precise control of the differing polarizing orientations of the right Rigid Insert 464 and the left Rigid Insert 414. The polarizing features may be enhanced by thermoforming the Rigid Insert 464, 414 to include a Three-dimensional Surface.

For example, when the Rigid Insert 404, 454 is assembled into an Ophthalmic Lens 400, 450, the Rigid Insert 404, 454 may be positioned with alignment features into a cavity formed between a front curve Mold and a back curve Mold. The Rigid Insert 404, 454 may be encapsulated by filling the area between the Mold Pieces with Reactive Monomer Mixture and then polymerizing the RMM. Numerous Reactive Monomer Mixtures may be consistent with the formation of molded Ophthalmic Devices, including, for example, those capable of forming hydrogel lenses, such as silicone hydrogel.

Some embodiments of the Ophthalmic Lenses 400, 450 may include Stabilizing Features 402, 452, wherein the Stabilizing Features 402, 452 may orient the Lenses 400, 450 on the eye and limit rotation. Stabilizing Features 402, 452 may be particularly significant in embodiments where the translation filter 401, 451 depends on a specific alignment. For example, the Viewing Set may include similar translation filters 401, 451, and two unique filtered translations may be caused by different alignments of the translation filters 401, 451 in the left Ophthalmic Lens 400 and the right Ophthalmic Lens 450.

Including the translation filters through a Rigid Insert may allow for additional passive functionalities imparted to the encapsulating material. For example, some embodiments may include a tinting in the Optic Zone. In some embodiments, the color tint may be an innate property of the encapsulating material. In other embodiments, the coloring property may be added to the encapsulating material by depositions, applications, or other means of imparting a color to the Reactive Monomer Mixture. A color tinting may provide a variety of functions in an Ophthalmic Lens. For example, the tinting may be useful in excluding or attenuating wavelengths of light as may be the function of shading ambient sunlight.

The tinting may provide safety functions where the tinting may block certain wavelengths thereby shielding or partially shielding the effect of intense radiation sources such as, for example, lasers or welding arcs. In some embodiments, the tinting 881 may address medical conditions in some users, who may benefit from either passing or rejecting certain wavelengths from entering the user's eye.

Figure 5:
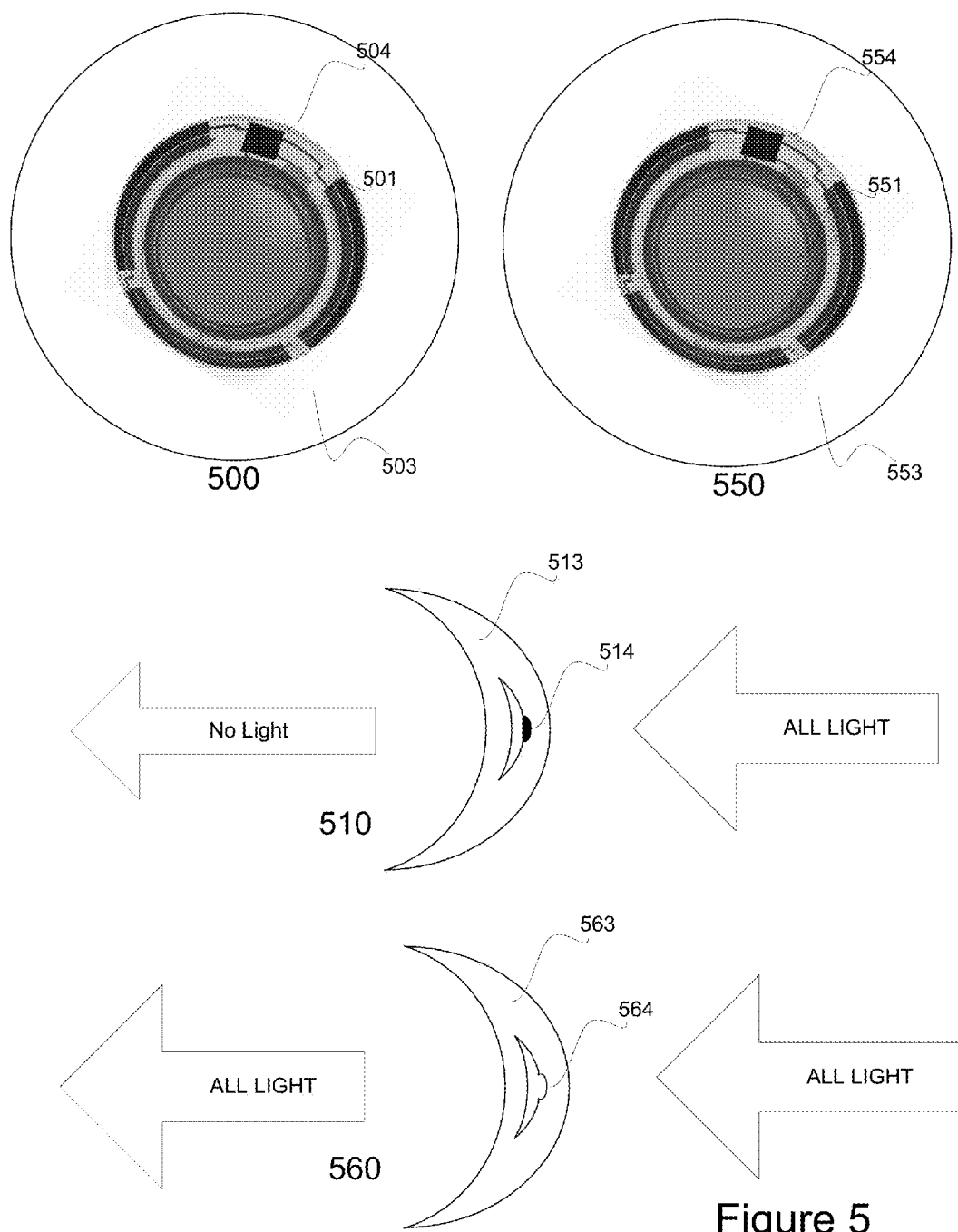
FIG. 5 illustrates an exemplary embodiment of a Viewing Set of Ophthalmic Lenses that may include Media Inserts, wherein the Media Insert includes the translation filters.

Proceeding to FIG. 5, an exemplary embodiment of a Viewing Set of Ophthalmic Lenses 500, 550 that includes a Media Insert 504, 554 is illustrated. In some such embodiments, the Media Insert 504, 554 may include the translation filters 501, 551 within a variable optic portion. Various energization elements may be included in regions outside the Optic Zone of the insert. The energization elements may include, for example, integrated circuits, passive electronic components, energization elements, and activation elements that may control the nature of the translation filters 501, 551.

The Media Insert 504, 554 may comprise multiple insert pieces, wherein the insert pieces may be formed through thermoforming techniques. For example, alignment features may allow two insert pieces and to lock into place without direct force to the Optic Zone portion or the component. This may allow for more delicate, but precise, assembly of a Media Insert 504, 554. For example, liquid crystal may be susceptible to damage caused by pressure or heat. In some embodiments, the front piece insert may be locked into the back piece insert, and the locking between the alignment features may maintain the positions of the two pieces. The Media Insert 504, 554 may be further secured by applying focused pressure or heat to more robust portions of the Media Insert 504, 554.

In some embodiments, the translation filters 501, 551 may comprise liquid crystal, wherein the activation of the liquid crystal may darken the translation filters 501, 551. The darkening may be sufficient to block light. The Viewing Set may provide Three-dimensional Perception through alternating activation of the left translation filter 501 and the right translation filter 551. In some embodiments, the left Ophthalmic Lens 500 may be in electrical communication with the right Ophthalmic Lens 550, which may allow the left Media Insert 504 to synchronize with the right Media Insert 554.

The frequency of the alternating activation may be configured to specific refresh rates of the stereoscopic media. In some embodiments, the activation may be programmed for a single frequency. Other embodiments may include a variable alternating activation frequency. For example, the Media Insert 504, 554 may include a sensor that may recognize the refresh rate of the viewed media, and the Media Insert 504, 554 may adjust the alternating activation frequency accordingly.

In some embodiments, a separate sensor may recognize when the user is viewing stereoscopic Media. This sensor may be capable of triggering a stop in activation when Three-dimensional Perception is not required. The ability to restrict activation may extend the battery life of the Media Insert and may allow extended wear, as the alternating activation may impede non-Three-dimensional Perception.

Figure 6:
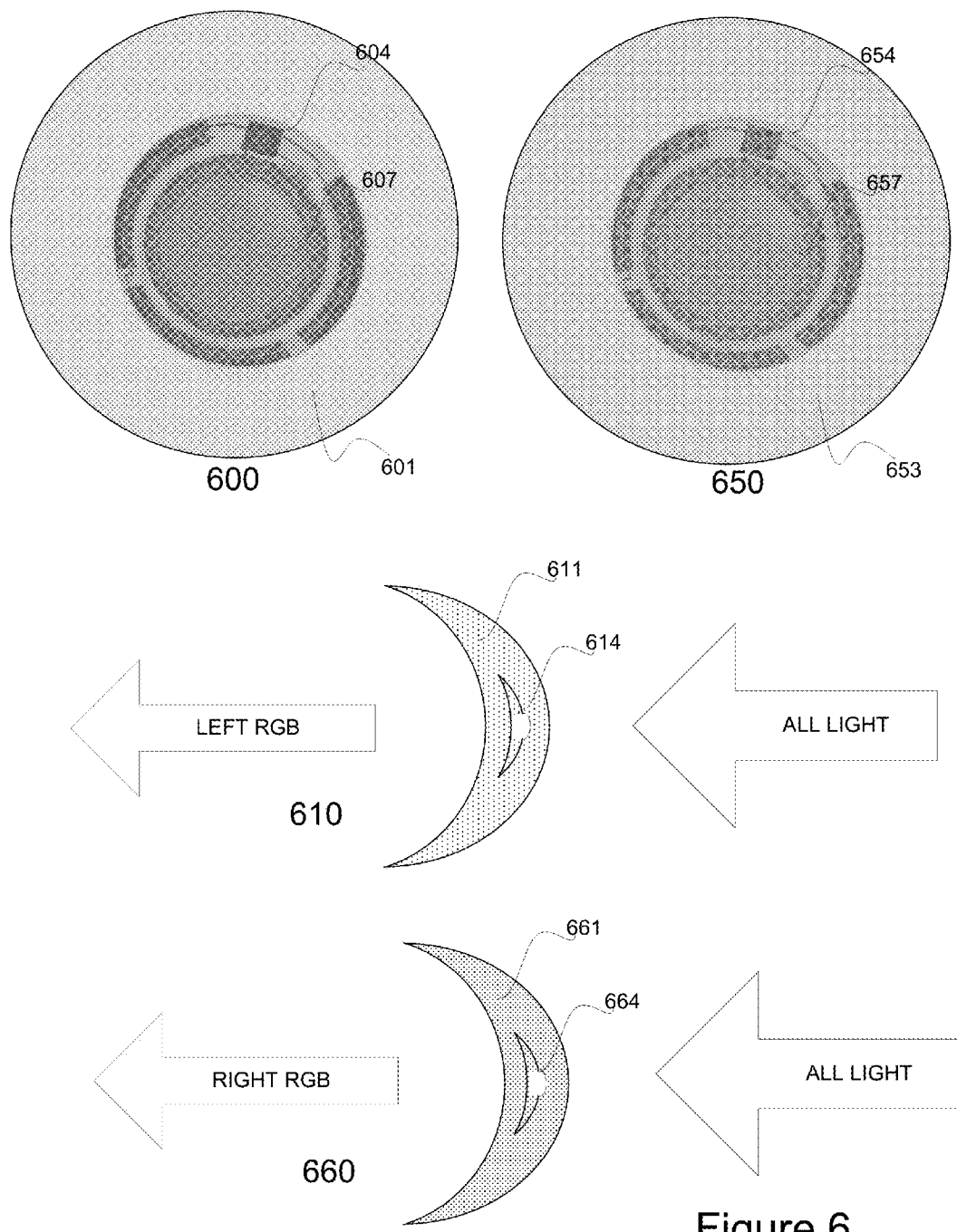
FIG. 6 illustrates an exemplary embodiment of a Viewing Set of Ophthalmic Lenses that may include Media Inserts, wherein the Media Insert does not control the translation filters.

Proceeding to FIG. 6, an alternate embodiment of a Viewing Set of Ophthalmic Lenses 600, 650 that includes a Media Insert 604, 654 is illustrated. In some such embodiments, the translation filter 601, 651 may be passive elements included in the polymerized RMM, and the Media Insert 604, 654 may include an active meniscus-base lens 607, 657 in the variable optic region 607, 657. The meniscus-based lens may allow for multiple powers of vision correction. For example, the variable optic region 607, 657 may contain at least two immiscible fluids that form an interface between them that may act as a focal element. Various energization elements may be included in regions outside the Optic Zone of the insert. The energization elements may include, for example, integrated circuits, passive electronic components, energization elements, and activation elements that may control the nature of the meniscus based lens.

In other embodiments, the Media Insert 604, 654 may comprise an annular shape, wherein the annular Media Insert 604, 654 does not include a region in the Optic Zone. Such embodiments may provide non-ophthalmic functionalities, including, for example, administration of an active agent or monitoring a specific characteristic of the ophthalmic environment, such as glucose or temperature.

In some embodiments, the Ophthalmic Lenses 600, 650 may include a passive Rigid Insert, not shown, in addition to the Media Insert 604, 654. The Rigid Insert may provide additional functionalities to the Ophthalmic Lenses 600, 650 with translation filters 601, 651 included in the polymerized Reactive Monomer Mixture. In some embodiments, thermoforming may add colored design to the Rigid Insert, which may add a cosmetic function to an Ophthalmic Lens 600, 650. The colored design may be located outside of the Optic Zone of the Ophthalmic Lens 600, 650. In some embodiments, a printed pattern may be included in an annular Rigid Insert. Alternatively, the translation filter may be included in the Rigid Insert.

In some embodiments of Viewing Sets, the translation filters may be imperceptible when Three-dimensional Viewing is not required. Such embodiments may allow for extended use of the Ophthalmic Lens. Extended use may be significant in embodiments where the Ophthalmic Lenses provide functionalities in addition to the translation filters. For example, Ophthalmic Lenses that include translation filters may correct vision, add cosmetic coloration to the eye, monitor the ophthalmic environment, or a combination thereof. Accordingly, in such embodiments, the translation filters may be visually ignored when the user is not viewing stereoscopic media.

Materials for Insert Based Ophthalmic Lenses

In some embodiments, a lens type can be a lens that includes a silicone containing component. A "silicone-containing component" is one that contains at least one [—Si—O—] unit in a monomer, macromer or prepolymer. Preferably, the total Si and attached O are present in the silicone-containing component in an amount greater than about 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, vinyl, N-vinyl lactam, N-vinylamide, and styryl functional groups.

In some embodiments, the Ophthalmic Lens skirt, which sometimes may be called an insert encapsulating layer, that surrounds the insert may be comprised of standard hydrogel lens formulations. Exemplary materials with characteristics that may provide an acceptable match to numerous insert materials may include the Narafilcon family; including Narafilcon A and Narafilcon B. Alternatively, the Etafilcon family; including Etafilcon A may represent good exemplary material choices. A more technically inclusive discussion follows on the nature of materials consistent with the art herein; but it may be clear that any material which may form an acceptable enclosure or partial enclosure of the sealed and encapsulated inserts are consistent and included.

Suitable silicone containing components include compounds of Formula I

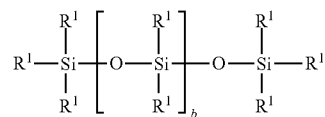

where:

$R^1$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500, where it is understood that when b is other than 0, b is a distribution having a mode equal to a stated value;

wherein at least one $R^1$ comprises a monovalent reactive group, and in some embodiments between one and 3 $R^1$ comprise monovalent reactive groups.

As used herein "monovalent reactive groups" are groups that can undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, $C_{1-6}$alkyl (meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates and O-vinylcarbonates. Non-limiting examples of cationic reactive groups include vinyl ethers or epoxide groups and mixtures thereof. In one embodiment the free radical reactive groups comprises (meth)acrylate, acryloxy, (meth)acrylamide, and mixtures thereof.

Suitable monovalent alkyl and aryl groups include unsubstituted monovalent $C_1$ to $C_{16}$alkyl groups, $C_6$-$C_{14}$ aryl groups, such as substituted and unsubstituted methyl, ethyl, propyl, butyl, 2-hydroxypropyl, propoxypropyl, polyethyleneoxypropyl, combinations thereof and the like.

In one embodiment b is zero, one $R^1$ is a monovalent reactive group, and at least 3 $R^1$ are selected from monovalent alkyl groups having one to 16 carbon atoms, and in another embodiment from monovalent alkyl groups having one to 6 carbon atoms. Non-limiting examples of silicone components of this embodiment include 2-methyl-,2-hydroxy-3-[3-[1,3,3,3-tetramethyl-1-[(trimethylsilyl)oxy]disiloxanyl]propoxy]propyl ester ("SiGMA"), 2-hydroxy-3-methacryloxypropyloxypropyl-tris(trimethylsiloxy)silane, 3-methacryloxypropyltris(trimethylsiloxy)silane ("TRIS"), 3-methacryloxypropylbis(trimethylsiloxy)methylsilane and 3-methacryloxypropylpentamethyl disiloxane.

In another embodiment, b is 2 to 20, 3 to 15 or in some embodiments 3 to 10; at least one terminal $R^1$ comprises a monovalent reactive group and the remaining $R^1$ are selected from monovalent alkyl groups having 1 to 16 carbon atoms, and in another embodiment from monovalent alkyl groups having 1 to 6 carbon atoms. In yet another embodiment, b is 3 to 15, one terminal $R^1$ comprises a monovalent reactive group, the other terminal $R^1$ comprises a monovalent alkyl group having 1 to 6 carbon atoms and the remaining $R^1$ comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"), monomethacryloxypropyl terminated mono-n-butyl terminated polydimethylsiloxanes (800-1000 MW), ("mPDMS").

In another embodiment b is 5 to 400 or from 10 to 300, both terminal $R^1$ comprise monovalent reactive groups and the remaining $R^1$ are independently selected from monovalent alkyl groups having 1 to 18 carbon atoms which may have ether linkages between carbon atoms and may further comprise halogen.

In one embodiment, where a silicone hydrogel lens is desired, the lens of the present invention will be made from a Reactive Mixture comprising at least about 20 and preferably between about 20 and 70% wt silicone containing components based on total weight of reactive monomer components from which the polymer is made.

In another embodiment, one to four $R^1$ comprises a vinyl carbonate or carbamate of the formula:

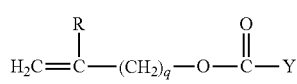

Formula II wherein: Y denotes O—, S— or NH—;
R denotes, hydrogen or methyl; d is 1, 2, 3 or 4; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio)propyl-[tris(trimethylsiloxy)silane]; 3-[tris(trimethylsiloxy)silyl]propyl allyl carbamate; 3-[tris(trimethylsiloxy)silyl]propyl vinyl carbamate; trimethylsilylethyl vinyl carbonate; trimethylsilylmethyl vinyl carbonate, and

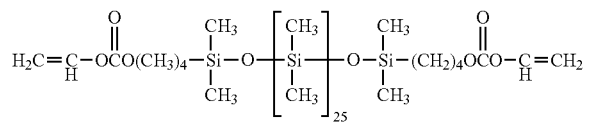

Where biomedical devices with modulus below about 200 are desired, only one $R^1$ shall comprise a monovalent reactive group and no more than two of the remaining $R^1$ groups will comprise monovalent siloxane groups.

Another class of silicone-containing components includes polyurethane macromers of the following formulae:

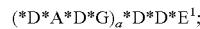

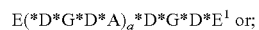

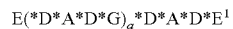

Formulae IV-VI wherein:

D denotes an alkyl diradical, an alkyl cycloalkyl diradical, a cycloalkyl diradical, an aryl diradical or an alkylaryl diradical having 6 to 30 carbon atoms, G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureido linkage;

$a$ is at least 1;

A denotes a divalent polymeric radical of formula:

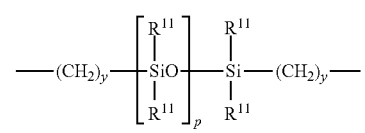

Formula VII $R^{11}$ independently denotes an alkyl or fluoro-substituted alkyl group having 1 to 10 carbon atoms which may contain ether linkages between carbon atoms; y is at least 1; and p provides a moiety weight of 400 to 10,000; each of E and $E^1$ independently denotes a polymerizable unsaturated organic radical represented by formula:

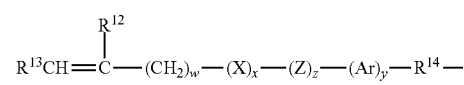

Formula VIII wherein: $R^{12}$ is hydrogen or methyl; $R^{13}$ is hydrogen, an alkyl radical having 1 to 6 carbon atoms, or a —CO—Y—$R^{15}$ radical wherein Y is —O—, Y—S— or —NH—; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred silicone-containing component is a polyurethane macromer represented by the following formula:

Formula IX (the full structure may be understood by joining corresponding asterisk regions, * to *,  to )

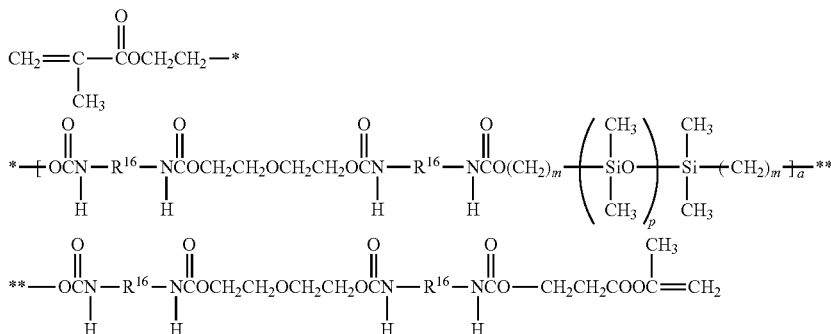

wherein $R^{16}$ is a diradical of a diisocyanate after removal of the isocyanate group, such as the diradical of isophorone diisocyanate. Another suitable silicone containing macromer is compound of formula X (in which x+y is a number in the range of 10 to 30) formed by the reaction of fluoroether, hydroxy-terminated polydimethylsiloxane, isophorone diisocyanate and isocyanatoethylmethacrylate.

Formula X (the full structure may be understood by joining corresponding asterisk regions, * to *)

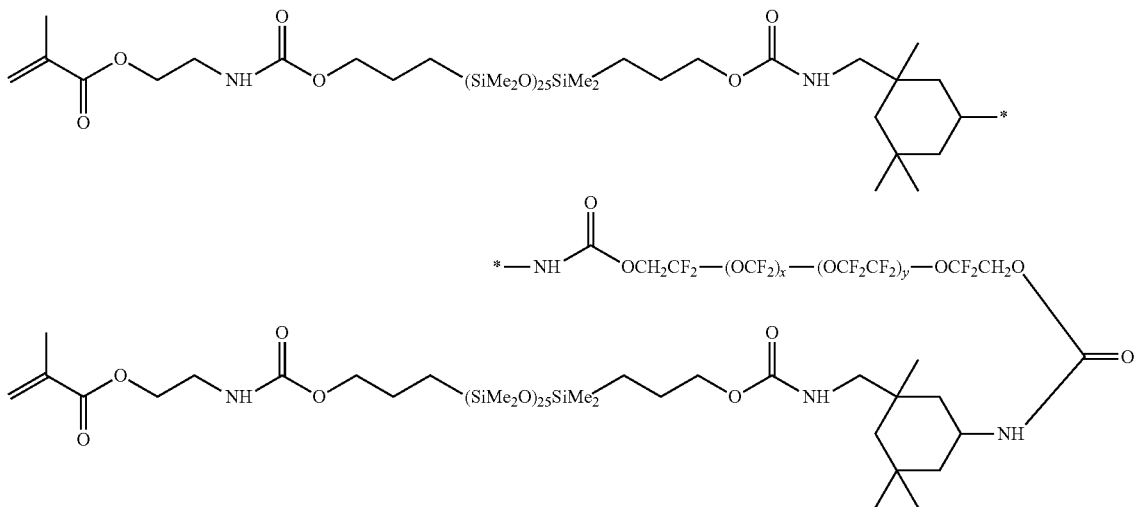

Other silicone containing components suitable for use in this invention include macromers containing polysiloxane, polyalkylene ether, diisocyanate, polyfluorinated hydrocarbon, polyfluorinated ether and polysaccharide groups; polysiloxanes with a polar fluorinated graft or side group having a hydrogen atom attached to a terminal difluoro-substituted carbon atom; hydrophilic siloxanyl methacrylates containing ether and siloxanyl linkages and crosslinkable monomers containing polyether and polysiloxanyl groups. Any of the foregoing polysiloxanes can also be used as the silicone-containing component in this invention.

CONCLUSION

The present invention, as described above and as further defined by the claims below, provides methods for creating Viewing Sets of Ophthalmic Lens with translation filters, including embodiments where the translation filters are included in an encapsulated Rigid Insert. The present invention also includes methods for forming a Media Insert capable of powering and controlling activation of an active translation filter, and more specifically, where the Media Insert may be incorporated in an Ophthalmic Lens Viewing Set.

The invention claimed is:

1. A viewing set of ophthalmic devices for three-dimensional perception of stereoscopic media, the set comprising:
   a first ophthalmic device configured to be placed on or in a first eye of a user, wherein the first ophthalmic device comprises a first insert device comprising a first media insert having a first variable optic region provided in an optic zone of the first ophthalmic device, and a first translation filter provided at least in the first variable optic region capable of providing the first eye with a first filtered translation of a stereoscopic media;
   a second ophthalmic device configured to be placed on or in a second eye of the user, wherein the second ophthalmic device comprises a second insert device comprising a second media insert having a second variable optic region provided in an optic zone of the second ophthalmic device, and a second translation filter provided at least in the second variable optic region capable of providing the second eye with a second filtered translation of the stereoscopic media;
   a media sensor provided within the first media insert, wherein the media sensor independently detects stereoscopic media; and a first activation load provided within the first media insert in electrical communication with the media sensor, wherein the first activation load activates the first variable optic region and the second variable optic region when stereoscopic media is detected by the media sensor and terminates activation of said variable optic regions when stereoscopic media is absent;

wherein the first filtered translation and the second filtered translation, when viewed concurrently, comprise a three-dimensional perception.

2. The viewing set of claim 1, wherein the first translation filter and the second translation filter comprise polarization elements.

3. The viewing set of claim 1, wherein the first translation filter and the second translation filter comprise dichroic filters.

4. The viewing set of claim 1, wherein:
the first translation filter comprises a first dichroic material, wherein the first dichroic material filters a first set of wavelength values;
the second translation filter comprises a second dichroic material, wherein the second dichroic material filters a second set of wavelength values; and
wherein a combination of the first and second set of wavelength values comprises a three-dimensional perception, when the first ophthalmic device and the second ophthalmic device are viewed concurrently.

5. The viewing set of claim 1, wherein the first translation filter and the second translation filter comprise polarization elements.

6. The viewing set of claim 1, wherein the first translation filter and the second translation filter comprise dichroic filters.

7. The viewing set of claim 1, wherein the first translation filter is included in the first insert device and the second translation filter is included in the second insert device through a thermoforming process.

8. The viewing set of claim 1, wherein:
the first variable optic region comprises a first liquid meniscus lens, wherein an energization of the first liquid meniscus lens is capable of altering a power of the first variable optic region; and
the second variable optic region comprises a second liquid meniscus lens, wherein an energization of the second liquid meniscus lens is capable of altering a power of the second variable optic region.

9. The viewing set of claim 1, wherein
the first and second variable optic regions comprise liquid crystal;
wherein an activation of the first variable optic region is capable of darkening the optic zone of the first insert device;
wherein an activation of the second variable optic region is capable of darkening the optic zone of the second insert device; and
wherein an alternating activation of the first variable optic region and the second variable optic region comprise the three-dimensional perception of the stereoscopic media.

10. The viewing set of claim 1, wherein the first media insert further comprises:
a rate sensor, wherein the rate sensor is capable of recognizing a refresh rate of the stereoscopic media; and
a second activation load in electrical communication with the rate sensor, wherein the second activation load is capable of synchronizing the alternating activation of the first variable optic region and the second variable optic region with the refresh rate of the stereoscopic media.

11. The viewing set of claim 1, wherein the media sensor recognizes the refresh rate of stereoscopic media.

12. The viewing set of claim 1, wherein the first and second translation filters are imperceptible when viewing non-stereoscopic media.

13. The viewing set of claim 12, wherein the first ophthalmic device and the second ophthalmic device further comprise a vision-correcting functionality.

14. The viewing set of claim 1, wherein
the first ophthalmic device further comprises a first stabilizing feature, wherein the first stabilizing feature is capable of orienting the first ophthalmic device on the first eye; and
the second ophthalmic device further comprises a second stabilizing feature, wherein the second stabilizing feature is capable of orienting the second ophthalmic device on the second eye.

15. The viewing set of claim 14, wherein the first stabilizing feature comprises a first visual orientation cue to the user, and the second stabilizing feature comprises a second visual orientation cue to the user.

* * * * *